(12) United States Patent
Jayaraman et al.

(10) Patent No.: US 8,331,463 B2
(45) Date of Patent: Dec. 11, 2012

(54) CHANNEL ESTIMATION IN COMMUNICATIONS

(75) Inventors: Srikant Jayaraman, San Diego, CA (US); June Namgoong, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1249 days.

(21) Appl. No.: 11/508,058

(22) Filed: Aug. 21, 2006

(65) Prior Publication Data

US 2011/0096853 A1    Apr. 28, 2011

Related U.S. Application Data

(60) Provisional application No. 60/710,372, filed on Aug. 22, 2005, provisional application No. 60/797,039, filed on May 1, 2006.

(51) Int. Cl.
    *H04K 1/10* (2006.01)
(52) U.S. Cl. ........................................ 375/260
(58) Field of Classification Search .......... 375/260, 375/316, 346
    See application file for complete search history.

(56) References Cited

U.S. PATENT DOCUMENTS

| | | |
|---|---|---|
| 6,996,195 B2 | 2/2006 | Kadous |
| 7,058,134 B2 | 6/2006 | Sampath |
| 7,209,510 B2 * | 4/2007 | Yang et al. ............... 375/147 |
| 7,499,709 B2 * | 3/2009 | Das et al. ................. 455/455 |
| 7,746,938 B2 * | 6/2010 | Hasegawa et al. ......... 375/260 |
| 2002/0049952 A1 * | 4/2002 | Lee et al. .................. 714/786 |

FOREIGN PATENT DOCUMENTS

| | | |
|---|---|---|
| DE | 10205742 | 12/2003 |
| EP | 1156637 A1 | 11/2001 |
| EP | 1401164 | 3/2004 |
| EP | 1533961 A2 | 5/2005 |

OTHER PUBLICATIONS

International Search Report and Written Opinion—PCT/US2006/032899, International Search Authority—European Patent Office—Apr. 18, 2007.
Taiwanese Search Report—TW095130849—TIPO, Jan. 7, 2010.

* cited by examiner

*Primary Examiner* — Kevin Kim
(74) *Attorney, Agent, or Firm* — Stanton Braden (57) ABSTRACT

A time averaging filter for channel estimation is described. Different time averaging is used for different taps or tones of a communication system. Two methods are suggested for determining the time-averaging filter for channel estimation for the communication systems without prior knowledge of SNR, channel Doppler and fading statistics. The first method includes a bank of different filters, each tuned for optimality in a certain range of SNR and Doppler. For each tone in the frequency domain (or tap in the time domain), the first method selects a filter among the set of filters that minimizes a certain computed metric. The second method directly computes, at each tone (or tap), the "best" filter in a least-squares sense, using empirically determined second-order statistics.

43 Claims, 8 Drawing Sheets

CHANNEL ESTIMATION IN COMMUNICATIONS

RELATED APPLICATIONS

The present patent application claims priority to Provisional Patent Application Nos. 60/710,372 and 60/797,039, filed Aug. 22, 2005 and May 1, 2006, respectively, which are each assigned to the assignee hereof and filed by the inventors hereof and which are incorporated by reference herein.

BACKGROUND

I. Field

The present invention relates generally to telecommunications, and more specifically to techniques for channel estimation in a communication system.

II. Background

In a typical telecommunications system, the data to be transmitted is encoded with a coder, such as, for example, a turbo coder, which generates a sequence of symbols, referred to as "code symbols." Several code symbols may be blocked together and mapped to a point on a signal constellation, thereby generating a sequence of complex "modulation symbols." This sequence may be applied to a modulator, which generates a continuous time signal, which is transmitted over a wireless channel.

At the receiver, the demodulator generates a sequence of modulation symbols or soft decisions. If soft decisions are generated, each soft decision represents an estimate of a modulation symbol that was transmitted over the channel. The estimates may be used to compute the log-likelihood ratio (LLR) of the code symbols. In the case of turbo coding, the turbo decoder uses the sequence of code symbol LLRs in order to decode the data that was originally transmitted.

When computing the LLRs of the code symbols, the propagation conditions of the channel should be considered. The channel conditions, or the channel impulse response, may be estimated at the receiver from a known pilot sequence embedded in the data transmission. By way of example, in Orthogonal Frequency Division Multiplexing (OFDM) systems, a Least Squares procedure is often used to estimate the channel. Using this procedure, the channel may be estimated from a set of pilot tones uniformly spaced across the frequency band of one OFDM symbol.

However, this channel estimate will be noisy because the pilot tones are corrupted with noise. Typically, in order to suppress the noise in the channel estimate for OFDM demodulation, the receiver typically averages (i.e. "filters") the channel estimate from multiple OFDM symbols. In other words, the channel estimate is time-averaged across OFDM symbols.

When the channel estimate is time-averaged, the noise in the channel estimate is suppressed. In other words, the noise variance of the time-averaged channel estimate is smaller than that of the channel estimate without time-averaging. The longer the time-averaging window, the more the noise suppression. However, the time-averaged channel estimate, even without its noise component, may not be the same as the true channel in the presence of channel variation. This difference is called the channel estimation bias. Hence, the channel estimation error includes of the noise and the bias.

E.g., if actual channel variation occurs on a timeframe of about the duration of one OFDM symbol and a time-averaging window is about the duration of 10 OFDM symbols, then the channel estimation will not be accurate for the channel even without the noise.

E.g., if the actual channel does not vary for about the duration of 10 OFDM symbols and the time averaging window is about the duration of 4 OFDM symbols, then the channel estimation bias is zero.

Hence, the longer time-averaging window leads to smaller noise variance, but larger channel estimation bias. The shorter time-averaging window leads to smaller channel estimation bias, but larger noise variance.

Thus, there are two competing goals: (1) The time-averaging window should be long enough to sufficiently suppress the noise, but (2) the time-averaging window should be short relative to the actual channel variation timeframe to avoid excessive channel estimation bias. The problem is how to select an optimum or useful time-averaging window in light of the competing goals.

The optimal degree of averaging depends on the SNR and the channel Doppler, both of which are unknown a priori.

When operating in the low SNR regime, longer time averaging reduces noise variance at the expense of increasing estimation bias due to channel variation over the averaging window. Since noise is the dominant source of degradation at low SNR, it is better to have long time averaging in this case.

If the noise variance is small compared to the channel estimation bias, it may be preferable to shorten the averaging duration thereby reducing bias in the channel estimate.

The optimal degree of averaging depends on the channel Doppler and SNR. Ideally we desire a receiver that automatically varies the degree of time averaging, in order to obtain the least overall degradation across all channel conditions.

There are several adaptive channel estimation algorithms. See, for example, "Adaptive channel estimation with velocity estimator for W-CDMA receiver," in Proc. IEEE VTC, May 2000, pp. 2024-2028, which is incorporated herein by reference. Typically, these algorithms estimate the access terminal speed and choose the amount of time-averaging based on a mathematical model for the fading statistics.

A common mathematical model for the fading statistics is Jakes' fading process. However, the many simplifying assumptions behind this model may not necessarily apply in the "real world". Estimating access terminal speed and choosing the amount of time-averaging based on a highly-simplified mathematical model may result in significantly inaccurate estimates of the actual rate of channel variation. For example, the access terminal could determine that the channel is varying much faster than it is in reality, and hence it may use a much smaller degree of time-averaging than necessary. Conversely, the access terminal could determine that the channel is varying much slower than it is in reality, and hence it may use a much larger degree of time-averaging than is desirable. In either situation, the discrepancy can produce higher channel estimation error, leading to higher decoding error rates. This undesirable property is sometimes referred to as "model mismatch" or "model sensitivity".

SUMMARY

Channel estimation is commonly a difficult problem in communication systems. Specifically, selecting a useful or optimal time-averaging window of the channel estimates is a major hurdle.

A solution for an orthogonal frequency division multiplex (OFDM) system is to estimate the channel differently for each tone or tap in the channel. This can result in a better channel estimate resulting in higher spectral efficiency.

Fundamentally, the channel variation rate and SNR is different for different frequencies or for different delay times. The following is described in terms of the time domain, that is, in terms of delay times (hereinafter, simply, delays, or channel tap), but the methods and devices described could similarly by performed in the frequency domain for OFDM systems.

In a first option, channel estimates are computed with a set of candidate time-averaging filters, calculating a metric for each of the candidate time-averaging filters, selecting a time-averaging filter based on the metrics calculated for the candidate time-averaging filters, and using the channel estimate of the selected time-averaging filter.

The above selection process can be performed separately for each delay, also known as tap, or for each frequency. For example, a time averaging filter is selected separately for each delay.

In a second option, useful or optimal time averaging filters are computed directly for two or more of the several taps. A least square based algorithm can be used to calculate the time-averaging filter. The algorithm can be performed separately for each delay, also known as tap, or for each frequency. For example, a time averaging filter is computed separately for each delay.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Motivation

To improve the quality of channel estimates in OFDM demodulation the receiver typically averages the channel estimate from multiple OFDM symbols. The optimal degree of averaging depends on the SNR and the Doppler, both of which are unknown a priori. Ideally we desire a receiver that automatically varies the degree of averaging, in order to obtain the least overall degradation across all channel conditions.

Channel Estimation without Time-Averaging

Figure 1:
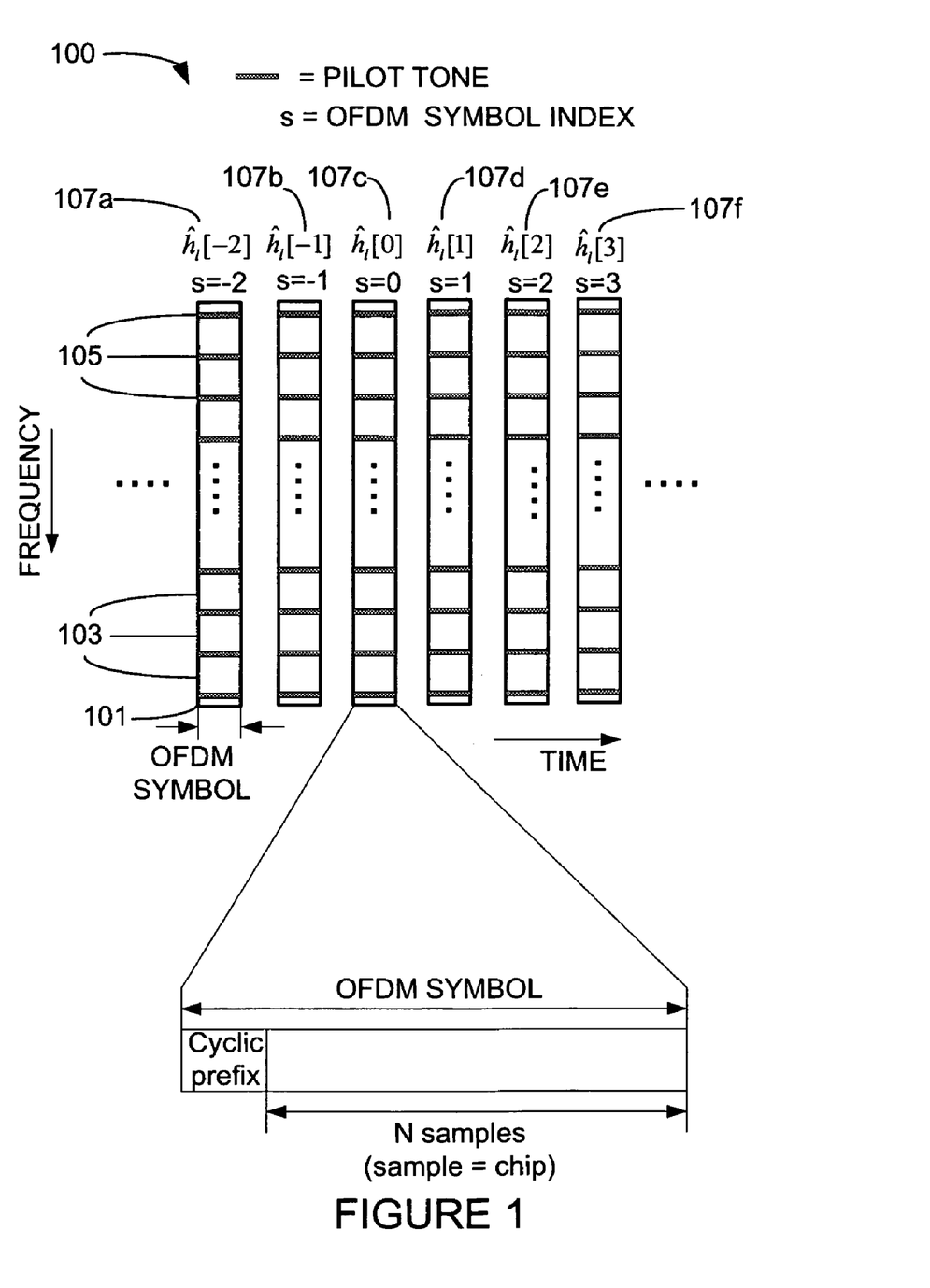
FIG. 1 shows a block diagram of a cellular wireless communication system.

Referring to FIG. 1, a series 100 of OFDM symbols is shown. Each OFDM symbol 101*a*, 101*b*, 101*c*, etc. includes data tones 103 and pilot tones 105. Let $\{h_l[s]\}$ denote the channel impulse response (CIR) for the s-th OFDM symbol. The pilot tones from the s-th OFDM symbol are used to obtain a noisy estimate of $\{h_l[s]\}$: $\hat{h}_l[s]=h_l[s]+n_l[s]$, where $n_l[s]$ is the estimation error with mean zero and variance $\sigma^2$. In other words, $\hat{h}_l[s]$ is a channel estimate of the l-tap of the CIR seen by the s-th OFDM symbol, obtained without time-averaging. Channel estimates $\hat{h}_l[-2]$ 107*a*, $\hat{h}_l[-1]$ 107*b*, $\hat{h}_l[0]$ 107*c*, $\hat{h}_l[1]$ 107*d*, $\hat{h}_l[2]$ 107*e* and $\hat{h}_l[3]$ 107*f* are shown, corresponding to OFDM symbol s=−2, −1, 0, 1, 2, and 3, respectively. The estimation error is assumed independent across the OFDM symbols.

Figure 2:
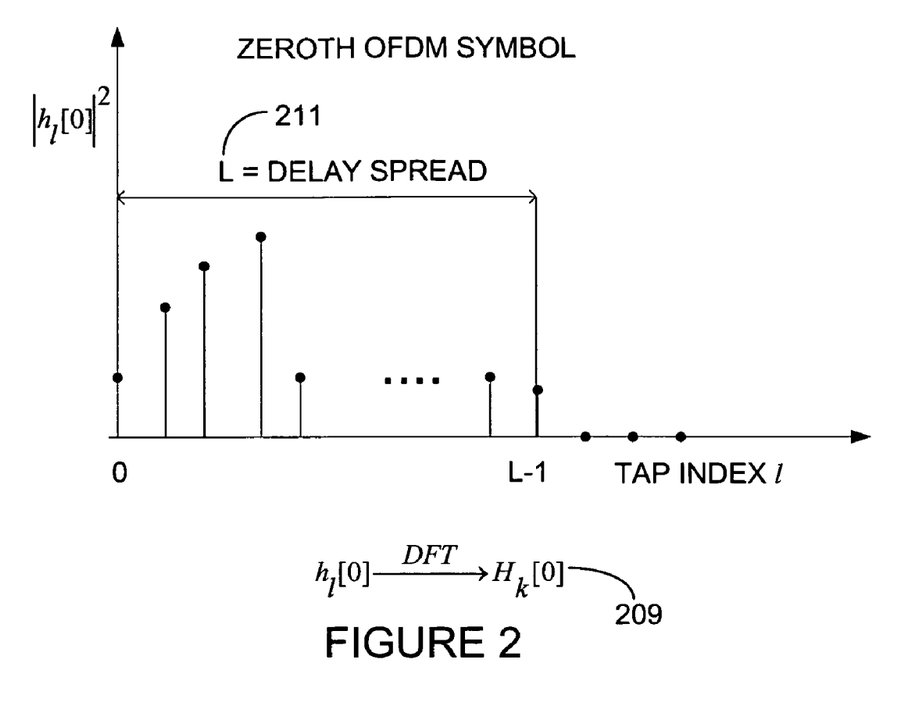
FIG. 2 is a graph illustrating a channel estimation process for a zeroth OFDM symbol.

Next, we estimate the channel coefficients at all the tones by a discrete Fourier transform (DFT) on $\{\hat{h}_l[s]\}$. FIG. 2 is a graph illustrating a channel estimation process for a zeroth OFDM symbol. We can let $H_k[s]$ 209 denote the channel coefficient at the k-th tone. Accordingly, we have $$\hat{H}_k[s] = H_k[s] + N_k[s],$$

where $$H_k[s] = \sum_{l=0}^{L-1} h_l[s] e^{-j\frac{2\pi kl}{N}},$$

$$N_k[s] = \sum_{l=0}^{L-1} n_l[s] e^{-j\frac{2\pi kl}{N}},$$

and L is the delay spread 211 assumed by the receiver. We assume that L is no smaller than the actual delay spread.

Channel Estimation with Time-Averaging

The receiver averages the channel estimates across multiple OFDM symbols to improve the overall quality of the estimates. The averaging can be done in either the time-domain on $\{\hat{h}_l[s]\}$, or in the frequency domain on $\{\hat{H}_k[s]\}$. Here we focus on time-domain averaging.

Without loss of generality we focus on the estimation of the channel $h_l[t]$ of the t-th OFDM symbol. Suppose that we have a bank of P candidate time-averaging filters with weights $w_p(n)$, where p=1, . . . , P. We denote the output of the p-th candidate filter as:

$$\bar{h}_{p,l}[t] = \sum_{n=-N^{(-)}}^{N^{(+)}} w_p(n)\hat{h}_l[t+n].$$

Thus, for each candidate filter p, $\bar{h}_{p,l}[t]$ is obtained by averaging one or more values of $\hat{h}_l[s]$. That is, $\bar{h}_{p,l}[t]$ is obtained by averaging values of $\hat{h}_l[s]$ according to the filter weights $w_p(n)$ of the given candidate filter p. The mean-square error (MSE) of the channel estimate for the l-th tap and p-th candidate filter is:

$$MSE_{p,l} = E|h_l[t] - \bar{h}_{p,l}[t]|^2 \tag{1}$$

Useful or Optimum Time-Averaging Filter

It is desirable to choose a filter which produces a channel estimate that is "close to" the true underlying channel in a least-squares sense. In particular we seek a candidate filter which minimizes (1). However, since the true underlying channel $h_l[t]$ is unknown, (1) cannot be computed directly.

One solution to this problem is to a) derive an alternate metric that can be computed without knowledge of the underlying channel, and b) show that a candidate filter which minimizes this metric also minimizes (1). Expand the right side of (1) as follows:

$$E|h_l[t]|^2 - 2Re\{E\{h_l^*[t]\overline{h}_{p,l}[t]\}\} + E|\overline{h}_{p,l}[t]|^2 \quad (2)$$

Note that the first term is independent of p and the third term can be determined from the candidate filter's output. Therefore, if we can compute the second term we can find the candidate filter which minimizes (1) based on the second and third terms of (2). Still, the second term depends on $h_l[t]$ which is unknown. Hence we rewrite the term $E\{h_l^*[t]\overline{h}_{p,l}[t]\}$ as follows:

$$E\{(\hat{h}_l[t] - n_l[t])^* \overline{h}_{p,l}[t]\} = E\{\hat{h}_l^*[t]\overline{h}_{p,l}[t]\} - w_p(0)\sigma^2 \quad (3)$$

Substituting this in (2), we get $$MSE_{p,l} = E|h_l[t]|^2 - 2Re[E\{\hat{h}_l^*[t]\overline{h}_{p,l}[t]\}] + E|\overline{h}_{p,l}[t]|^2 + 2w_p(0)\sigma^2 \quad (4)$$

If we know the noise variance $\sigma^2$, the MSE can be decomposed into an unknown term that is common to all the candidate filters, and terms that can be computed from each candidate filter's output without knowledge of the true channel. Consider the cost function defined by removing the common term $E|h_l[t]|^2$ from (4) and adding the common known term $E|\hat{h}_l[t]|^2$:

$$M_l(p) = MSE_{p,l} + E\{|\hat{h}_l[t]|^2 - |h_l[t]|^2\} \quad (5)$$

$$= E\{|\hat{h}_l[t] - \overline{h}_{p,l}[t]|^2\} + 2w_p(0)\sigma^2$$

The candidate filter p that minimizes the metric $M_l(p)$ also minimizes $MSE_{p,l}$.

For a practical implementation, the ensemble average in (5) can be replaced by the time average, and the noise variance $\sigma^2$ can be replaced by an estimate $\hat{\sigma}^2$ derived from the pilot tones. The noise variance may be estimated using an estimation procedure similar to co-assigned U.S. patent application Ser. No. 11/047,347, filed on Jan. 28, 2005, entitled "Noise Variance Estimation in Wireless Communications for Diversity Combining and Log-Likelihood Scaling," which is incorporated herein by reference. The metric at the l-th tap from the p-th candidate filter is then approximately $$M_l(p) \approx M'_l(p) + 2w_p(0)\hat{\sigma}^2, \quad (6)$$

where $$M'_l(p) = \overline{|\hat{h}_l[t] - \overline{h}_{p,l}[t]|^2}$$

and the overline denotes averaging over an exponential window of length $T_{avg}$. When the channel for the t-th OFDM symbol is estimated, we update $M_l(p)$ using:

$$M_l(p) \leftarrow \left(1 - \frac{1}{T_{avg}}\right)M_l(p) + \frac{1}{T_{avg}}\left(|\hat{h}_l[t] - \overline{h}_{p,l}[t]|^2 + 2w_p(0)\hat{\sigma}^2\right),$$

where $\hat{\sigma}^2$ is the estimate of the noise variance $\sigma^2$ available at the time of update. In other words, $M_l(p)$ can be calculated using a one-tap auto-regressive filter.

Note that if we used $M'_l(p)$ as a metric, the minimizing filter would be degenerate and there would be no averaging, i.e., $\overline{h}_{p,l}[t] = \hat{h}_l[t]$. The key twist is the addition) of $2w_p(0)\hat{\sigma}^2$, and this results in a metric that correctly trades off reduced bias, between an instantaneous and averaged channel estimate, against increased noise variance.

Based on the metric $M_l(p)$, we suggest two methods to determine the time averaging filter in the following.

Filter Selection Algorithm (FSA)

In a filter selection algorithm there is a bank of different candidate averaging filters, which may be, for example each tuned for a certain range of SNR and Doppler. For the l-th tap of the CIR ($0 \leq l \leq L-1$), we choose the candidate filter $p_{sel}$ with the smallest metric:

$$p_{sel}(l) = \underset{1 \leq q \leq P}{\operatorname{argmin}} M_l(q).$$

For example, suppose that there are three candidate filters for FSA. (P=3), with $N^{(-)}=2$, $N^{(+)}=2$. In the example, the first candidate filter (p=1) is defined as follows: $w_1(-2) = w_1(-1) = w_1(0) = w_1(1) = w_1(2) = 1/5$; the second candidate filter (p=2) is defined as follows: $w_2(-1) = w_2(0) = w_2(1) = 1/3$; $w_2(-2) = w_2(2) = 0$; and the third candidate filter (p=3) is defined as follows: $w_3(-2) = w_3(-1) = w_3(0) = w_3(1) = w_3(2) = 0$. Note that the third candidate filter is a zero filter, having coefficients all equal to zero.

In the above example, for the zeroth OFDM symbol, the time averaged filter outputs are computed as follows:

$$\overline{h}_{1,l}[0] = 0.2\hat{h}_l[-2] + 0.2\hat{h}_l[-1] + 0.2\hat{h}_l[0] + 0.2\hat{h}_l[1] + 0.2\hat{h}_l[2];$$

$$\overline{h}_{2,l}[0] = 0.33\hat{h}_l[-1] + 0.33\hat{h}_l[0] + 0.33\hat{h}_l[1]; \text{ and}$$

$$\overline{h}_{3,l}[0] = 0.$$

The metric is computed for each filter and for each tap. For each tap, the candidate filter with the lowest metric is chosen as the averaging filter for channel estimation for that tap.

Least-Square Based Algorithm (LSA)

In a least squares based algorithm, we directly solve for the filter that minimizes $M_l(p)$, i.e., $$w_{opt} = \underset{w}{\operatorname{argmin}} E\{|\hat{h}_l[t] - w^T \hat{h}_l(t)|^2\} + 2w(0)\sigma^2$$

where $\hat{h}_l(t) = [\hat{h}_l[t-N^{(-)}], \ldots, \hat{h}_l[t], \ldots, \hat{h}_l[t+N^{(+)}]]^T$, w is a real vector of the filter weights, and superscript T denotes a matrix transpose operation. Define $\Delta = N^{(-)} + 1$, and a vector $1_\Delta$ as a vector of 0's with a 1 in the $\Delta$-th position.

The optimum filter for the l-th tap ($0 \leq l \leq L-1$) can be approximated by $$w_{opt} \approx \hat{R}_l^{-1} \hat{p}_l \quad (7)$$

where $\hat{R}_l$ is an empirical correlation matrix for the l-tap defined by $\hat{R}_l = \overline{Re\{\hat{h}_l(t)\hat{h}_l^H(t)\}}$, and $\hat{p}_l$ is an empirical cross-correlation vector for the l-th tap defined by $\hat{p}_l = \overline{Re\{\hat{h}_l^*[t]\hat{h}_l(t)\}} - \hat{\sigma}^2 1_\Delta$. When the channel for the t-th OFDM symbol is estimated, update $\hat{R}_l$ and $\hat{p}_l$ by the following auto-regressive steps:

$$\hat{R}_l \leftarrow \left(1 - \frac{1}{T_{avg}}\right)\hat{R}_l + \frac{1}{T_{avg}} Re\left(\hat{h}_l(t)\hat{h}_l^H(t)\right),$$

$$\hat{p}_l \leftarrow \left(1 - \frac{1}{T_{avg}}\right)\hat{p}_l + \frac{1}{T_{avg}}\left(Re(\hat{h}_l^*[t]\hat{h}_l(t)) - \hat{\sigma}^2 1_\Delta\right),$$

where $\hat{\sigma}^2$ is the estimate of the noise variance $\sigma^2$ available at the time of update. In other words, $\hat{R}_l$ is computed using $\hat{h}_l(t+s)\hat{h}_l^H(t+s)$, for all $s \leq 0$ and $\hat{p}_l$ is computed using $\hat{h}_l^*(t+s)\hat{h}_l(t+s)$, for all $s \leq 0$.

After each tap of the CIR is estimated by using the filters determined by the algorithms (FSA or LSA), the channel estimate at each tone is obtained by performing a DFT of these estimated taps.

Explanation Regarding PER-TONE ADAPTATION

The following is a practical example demonstrating why using different filters for different tones or taps is advantageous. When time-averaging is performed in the frequency domain, it is easy to see why a different filter is necessary across different tones. Although each multipath component may fade at a similar rate, the frequency domain channel coefficients will generally experience different rates of change. As a simple example, consider a channel with two equal strength paths. Suppose that the channel H(z) is initially given by $1+z^{-1}$, and a slot later by $(1+\delta)+(1-\delta)z^{-1}$. The response at f=0 does not change at all, whereas the response at the band-edge f=0.5 changes from 0 to $2\delta$. The different rates of change between f=0 compared to f=0.5 would result in larger channel estimation error if the same time averaging filter was used at f=0 and f=0.5.

Explanation Regarding PER-TAP ADAPTATION

When time-averaging is performed in the time domain, the optimum filter is usually different from tap to tap because each tap in the CIR has different energy. In a typical situation, some of the taps within the assumed delay spread L may contain virtually no signal energy. In this case it is preferable to "zero out" those taps thereby reducing noise and improving overall channel estimation quality. A common solution is to force to zero those taps with energy below a certain threshold. This approach is referred to as "hard thresholding". But if a tap contains some signal energy, zeroing a tap improves channel estimation only if the MSE at that tap exceeds the tap's signal energy. Since it is difficult to find an optimum level for hard-thresholding that minimizes channel estimation error, it is desirable to have an alternative way to zero out noisy taps.

Explanation Regarding Soft Thresholding

Recall that a filter based on (6) minimizes the MSE at each tap. Suppose now that a certain tap contains less signal energy than other taps. The chosen filter at this tap will have smaller coefficients but at the same time, in order to reduce noise variance, it will have a larger degree of time-averaging than at other taps. As a result, this tap will be effectively de-emphasized compared to other taps in the CIR. It follows that this algorithm automatically reduces the contribution of the noisy taps to the frequency-domain channel estimates, leading to lower MSE in the channel coefficients at each tone. In summary, with the per-tap adaptation algorithm, a tap is de-emphasized in an optimal sense of minimizing its contribution to overall MSE—per-tap adaptation achieves optimal "soft-thresholding".

Optimum Hard Thresholding

Now suppose that we were only able to implement a fixed filter, yet we desired performance similar to hard-thresholding. One solution is to consider a bank consisting of the fixed filter and another filter with zero weights, and to apply per-tap FSA. This algorithm will optimally select between averaging a tap with the fixed filter or forcing it to zero.

Simulation Results

Simulations were produced using a system similar to Enhanced BCMCS described in "Updated harmonized Enhanced Broadcast Multicast System Proposal for 1xEV-DO", 3GPP2 TSG-C contribution, C30-20050418-039R1, Apr. 18, 2005, which is incorporated herein by reference. Each OFDM symbol includes 320 tones, and every fifth tone is a pilot tone. Hence, there are 64 uniformly spaced pilot tones. Among the remaining 256 tones, 240 tones are data tones and 16 tones are null tones in the guard band. Four OFDM symbols make up an "OFDM slot". Since adjacent slots may not be OFDM slots in the system under simulation, channel estimation for symbols within a particular OFDM slot is performed using only the CIR estimates from the same slot. Hence, the two OFDM symbols on the edges of the slot and in the middle of the slot use different filters, respectively.

A 1.8 Mbps data rate (3072 bits/slot, spectral efficiency of 3.2 bps/Hz) with 64-QAM and a dual antenna receiver was simulated. The receiver truncates the CIR estimate to L=32 taps. The fading is modeled as Rayleigh with a Pedestrian B ITU channel model, as defined in "1xEV-DO Broadcast Multicast Service Evaluation Methodology", 3GPP2 TSG-C contribution, C30-20041018-015, Oct. 18, 2004, which is incorporated herein by reference. The noise estimate $\sigma^2$ is obtained from the pilot tones and the channel estimates $\{\hat{H}_k[s]\}$ for those pilot tones.

Three techniques were simulated and compared. In the first technique simulated, an evaluation was made for selecting between different fixed filters for different symbols. The fixed filters are as follows:

(1) For the zeroth OFDM symbol, $N^{(+)}=3$ and $N^{(-)}=0$. The set of candidate filters is: Filter 1 has weights 0.9, 0.1, 0 and 0. Filter 2 has weights 2/3, 1/3, 0 and 0. Filter 3 has weights 0.5, 0.25, 0.25 and 0.

(2) For the first OFDM symbol, $N^{(+)}=2$ and $N^{(-)}=1$. The set of candidate filters is: Filter 1 has weights 0.25, 0.5, 0.25 and 0. Filter 2 has weights 1/3, 1/3, 1/3 and 0. Filter 3 has weights 0.25, 0.25, 0.25 and 0.25.

The candidate filters for the second OFDM symbol are the same as the candidate filters for the first OFDM symbol, except reversed in time. The candidate filters for the third OFDM symbols are the same as for the zeroth OFDM symbol, except reversed in time. The above structure of different filter sets is used because of the OFDM slot structure of the simulated communication system, in which adjacent slots may not be OFDM slots. The zeroth and third OFDM symbols are on the edges of slots, whereas the first and second OFDM symbols are in the middle of slots. The methods and devices described herein can be applied to communication systems where the same sets of filters are applied to all OFDM symbols.

Roughly speaking, Filter 1 is best at high Dopplers whereas Filter 3 is best at low Dopplers. Filter 2 has been used in the BCMCS evaluation of "1xEV-DO Broadcast Multicast Service Evaluation Methodology", 3GPP2 TSG-C contribution, C30-20041018-015, Oct. 18, 2004, which is incorporated herein by reference.

In a second technique simulated, the effect of hard-thresholding was studied by augmenting the above three filters with a zero filter (all weights are zero). Finally, in a third technique simulated the benefits of soft-thresholding was evaluated using LSA. For all three techniques simulated, 16 slot exponential averaging windows with updates every slot were used.

Figure 3:
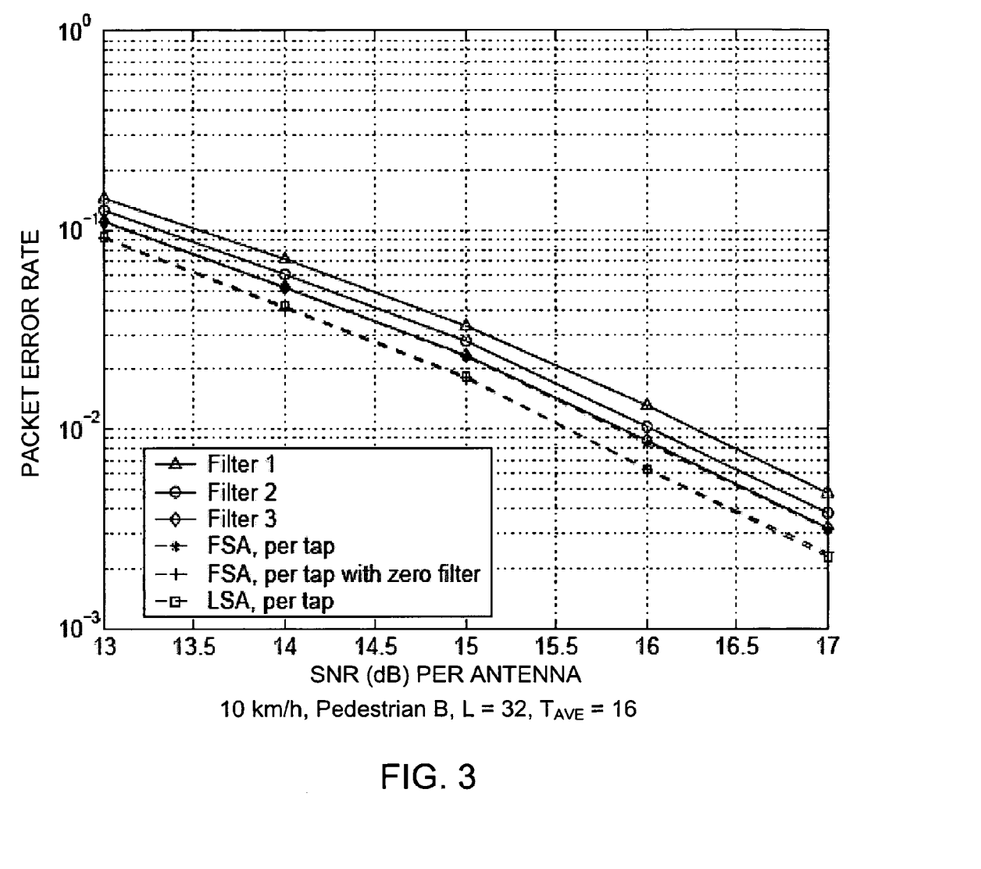
FIG. 3 is a graph illustrating simulation results for a 10 km/h access terminal.
Figure 4:
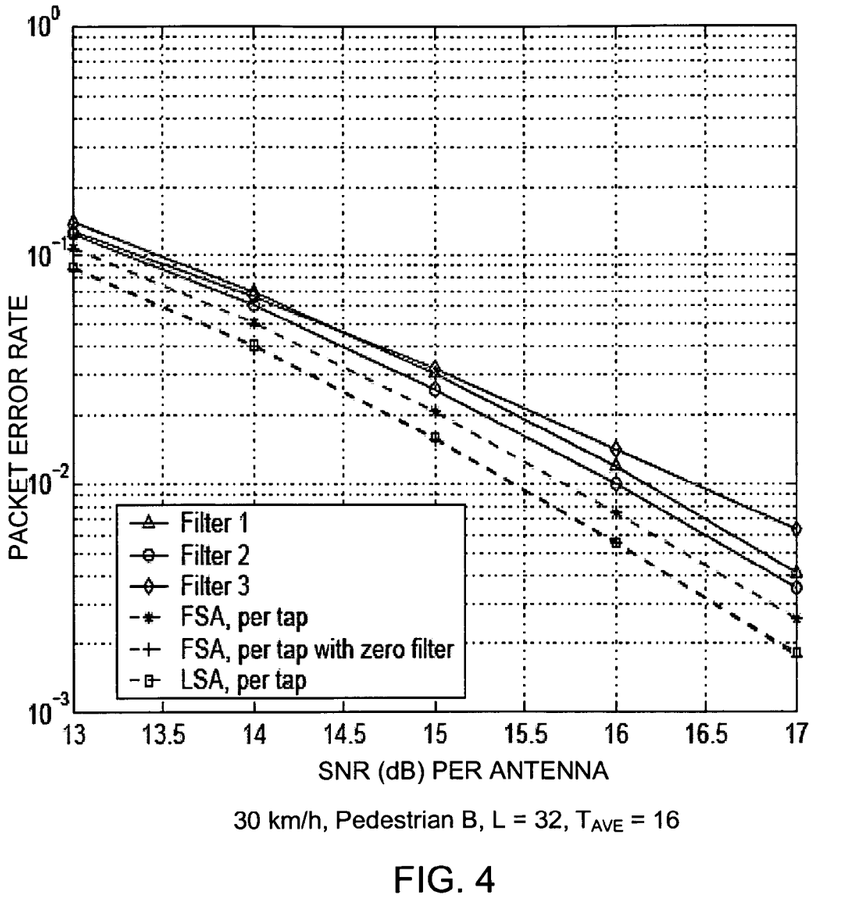
FIG. 4 is a graph illustrating simulation results for a 30 km/h access terminal.
Figure 5:
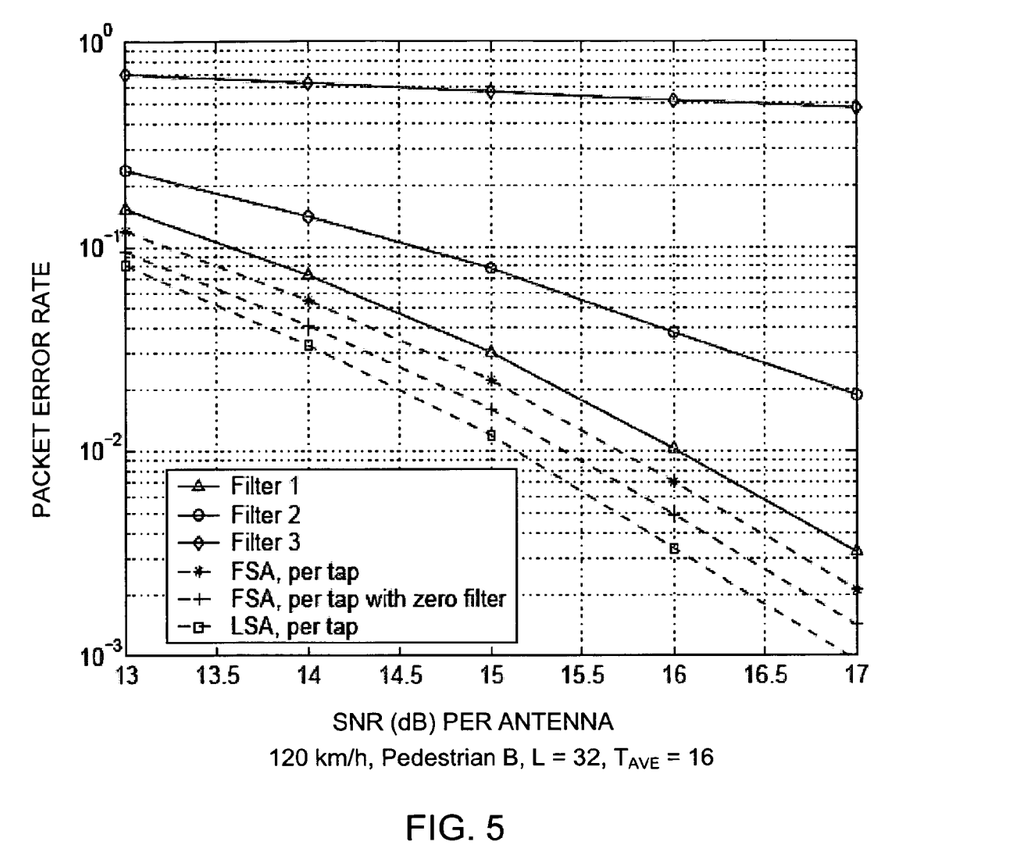
FIG. 5 is a graph illustrating simulation results for a 120 km/h access terminal.

The performance of these three techniques is shown in FIGS. 3, 4 and 5 for user speeds of 10, 30, and 120 km/h. As a baseline for comparison, the figures show the performance for a receiver that always uses the same fixed filter. In terms of best to worst performance for the fixed filters, the ordering at 10 km/h is Filter 1, 2, and 3. This ordering is reversed at 120 km/h. Thus, no filter is optimum across all Dopplers or speeds. On the other hand, the FSA results in performance that is at least as good as the best fixed filter at each Doppler. Optimal hard-thresholding yields an additional gain of 0.25 to 0.5 dB over selection alone. The LSA outperforms hard-thresholding and provides a further gain of 0.25 dB or more at high Dopplers.

The channel estimation techniques can be implemented in a wireless communication network having access points and access terminals. The access points may be, for example, base stations in an OFDM cellular system. The access terminals may be, for example, wireless handsets such as cell phones, or other terminal devices such as a laptop computer with a wireless communication card or a built-in transceiver.

Figure 6:
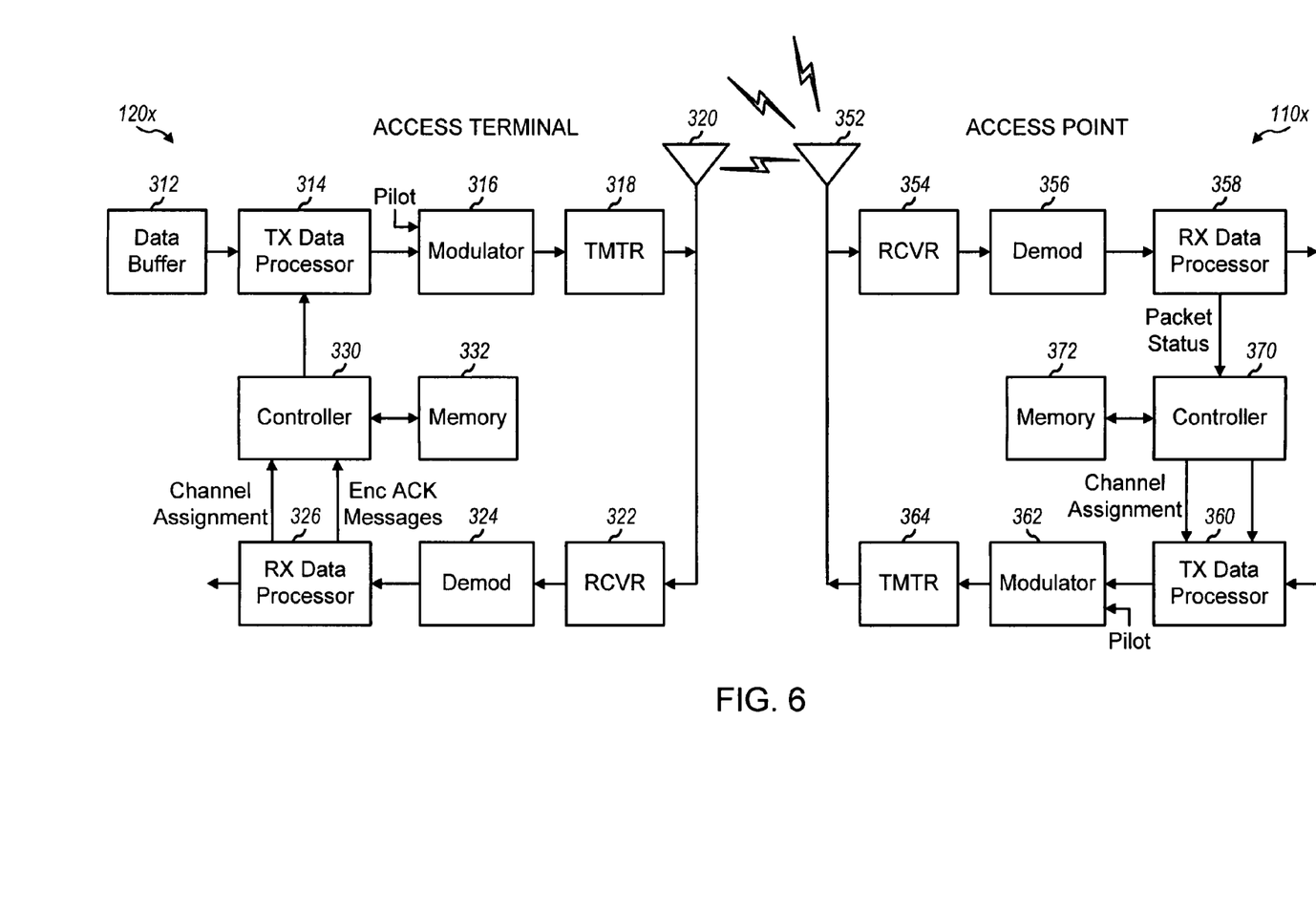
FIG. 6 is a diagram illustrating an access point and an access terminal.

FIG. 6 shows a block diagram of an access point 110 and an access terminal 120, for implementing channel estimation as discussed above in connection with FIGS. 1 to 5. For the reverse link, at terminal 120, a transmit (TX) data processor 314 receives traffic data from a data buffer 312, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 316 receives the data symbols, pilot symbols, and possibly signaling for the reverse link, performs OFDM modulation and/or other processing as specified by the system, and provides a stream of output chips. A transmitter unit (TMTR) 318 processes (e.g., converts to analog, filters, amplifies, and frequency up converts) the output chip stream and generates a modulated signal, which is transmitted from an antenna 320.

At access point 110, the modulated signals transmitted by terminal 120 and other terminals in communication with access point 110 are received by an antenna 352. A receiver unit (RCVR) 354 processes (e.g., conditions and digitizes) the received signal from antenna 352 and provides received samples. A demodulator (Demod) 356 processes (e.g., demodulates and detects) the received samples and provides detected data symbols, which are noisy estimate of the data symbols transmitted by the terminals to access point 110. For the reverse link techniques described herein may be carried out in Demod 356. A receive (RX) data processor 358 processes (e.g., symbol demaps, deinterleaves, and decodes) the detected data symbols for each terminal and provides decoded data for that terminal.

For the forward link, at access point 110, traffic data is processed by a TX data processor 360 to generate data symbols. A modulator 362 receives the data symbols, pilot symbols, and signaling for the forward link, performs OFDM modulation and/or other pertinent processing, and provides an output chip stream, which is further conditioned by a transmitter unit 364 and transmitted from antenna 352. The forward link signaling may comprise power control commands generated by a controller 370 for all terminals transmitting on the reverse link to base station 110. At terminal 120, the modulated signal transmitted by base station 110 is received by antenna 320, conditioned and digitized by a receiver unit 322, and processed by a demodulator 324 to obtain detected data symbols. For the forward link, techniques described herein may be carried out in demodulator 324. An RX data processor 326 processes the detected data symbols and provides decoded data for the terminal and the forward link signaling. Controller 330 receives the power control commands, and controls data transmission and transmits power on the reverse link to access point 110. Controllers 330 and 370 direct the operation of terminal 120 and access point 110, respectively. Memory units 332 and 372 store program codes and data used by controllers 330 and 370, respectively, to implement the channel estimation as discussed herein.

Figure 7:
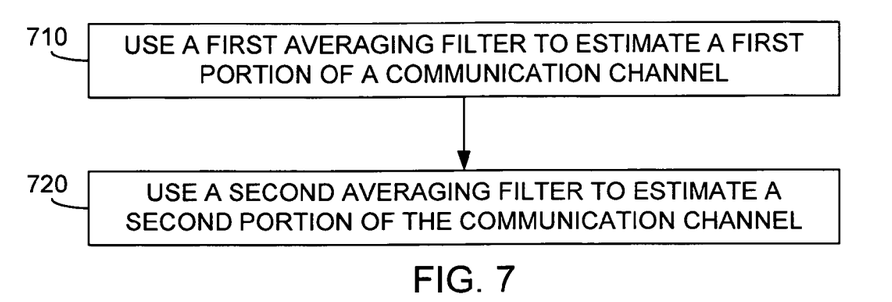
FIG. 7 is a flow diagram illustrating a method for calculating a channel estimate in a communication system as described herein.

FIG. 7 is a flow diagram illustrating a method for calculating a channel estimate in a communication system as described herein. The method starts at step 710. In step 710, a first averaging filter is used to estimate a first portion of a communication channel. The first averaging filter may be, for example, Filter 1, Filter 2 or Filter 3, described above with respect to FIGS. 3 to 5. The first portion may be a first tap or a first tone or frequency as described herein. In step 720, a second averaging filter is used to estimate a second portion of the communication channel. The second averaging filter may be, for example, Filter 1, Filter 2, or Filter 3, described above with respect to FIGS. 3 to 5. The second portion may be a second tap or a second tone or frequency as described herein.

Figure 8:
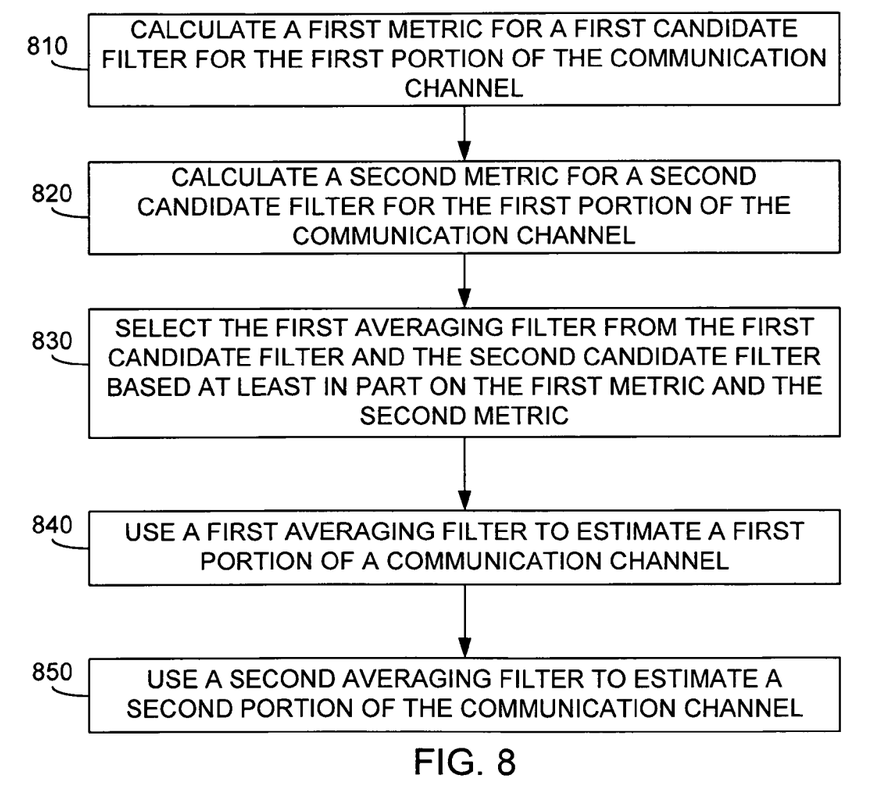
FIG. 8 is a flow diagram illustrating a method for calculating a channel estimate in a communication system as described herein.

FIG. 8 is a flow diagram illustrating a method for calculating a channel estimate in a communication system as described herein. FIG. 8 is similar to FIG. 7, except that three steps 810, 820 and 830 are added before the steps of FIG. 7, which correspond to steps 840 and 850 in FIG. 8. The method starts at step 810. In step 810, a first metric for a first candidate filter for the first portion of the communication channel is calculated. In step 820, a second metric for a second candidate filter for the first portion of the communication channel is calculated. In step 830, the first averaging filter is selected from the first candidate filter and the second candidate filter based at least in part on the first metric and the second metric.

Step 810 may be include calculating a first function of a first difference between a channel estimate of the first portion of the communication channel obtained without time averaging and a channel estimate of the first portion from the first candidate filter; calculating a first correction factor as a second function of a first noise variance estimate and at least one of a plurality of weights of the first candidate filter; adding the first correction factor to the first function to obtain a third function; and filtering the third function to obtain the first metric. The first function may comprise a magnitude squared function. The third function may comprise using an auto-regressive filter to obtain the first metric. Step 810 may include calculating the first metric based on a zero weight filter having only zeros for a plurality of filter weights of the zero weight filter.

The communication system may be, to list two examples, an orthogonal frequency division multiple access system or a code division multiple access system.

The method may also include calculating the first averaging filter based at least in part on a first past history of the channel estimates of the first portion of the communication channel without time averaging and based at least in part on a first noise variance; and calculating the second averaging filter based at least in part on a second past history of the channel estimates of the second portion of the communication channel without time averaging and based at least in part on a second noise variance.

Further, the method may include calculating the first averaging filter by: calculating a first outer-product of a first vector formed from the first past history of the channel estimates of the first portion of the communication channel, obtained without time-averaging, corresponding to a plurality of OFDM symbols; filtering the first outer-product to obtain an empirical correlation matrix; multiplying the first vector by a complex conjugate of the channel estimate of the first portion of the communication channel obtained without time-averaging, to obtain a second vector; subtracting a noise variance estimate from one of the elements of the second vector, to obtain a third vector; filtering the third vector to obtain an empirical cross-correlation vector; and multiplying an inverse of the empirical correlation matrix by the empirical cross-correlation vector to obtain the first averaging filter.

The filtering the first outer-product to obtain an empirical correlation matrix comprises using an auto-regressive filter to filter the first outer-product to obtain an empirical correlation matrix; and wherein, the filtering the third vector comprises using a second auto-regressive filter to filter the third vector to obtain an empirical cross-correlation vector.

For the first portion, the first metric may be $M_1(1)$, and the second metric may be $M_1(2)$, as described herein. For the second portion, the first metric may be $M_2(1)$, and the second metric may be $M_2(2)$, as described herein. In step 830, the first averaging filter is selected based at least in part on the first metric and the second metric of the first portion, and the second averaging filter is selected based at least in part on the first metric and the second metric of the second portion. For example, the first and the second metric of the first portion may be compared and the candidate filter producing the lowest metric is selected as a first averaging filter in step 830. Many more candidate filters and many more portions are likely in a practical system. Two candidate filters, two portions and two metrics per portion are used here for illustration. The techniques and systems described will repeated as many times as required or convenient for the communication system used, such as and OFDM system. In some cases, calculating the first metric for the channel estimate of the first portion may include calculating the first metric based on a zero weight filter having only zeros for a plurality of filter weights of the zero weight filter.

In some embodiments, the method includes calculating the first averaging filter based on a least squares algorithm (LSA) and calculating the second averaging filter based on the least squares algorithm (LSA).

Figure 9:
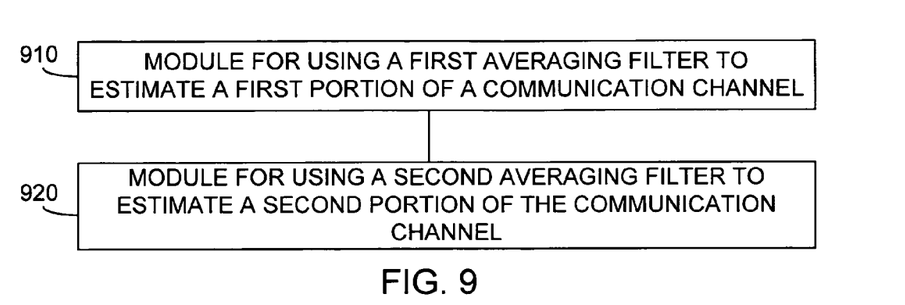
FIG. 9 is a diagram illustrating a demodulator for calculating a channel estimate in a communication system as described herein.

FIG. 9 is a diagram illustrating a demodulator for calculating a channel estimate in a communication system as described herein. For example, FIG. 9 may be included in Demod 356 or demodulator 324, shown with respect to FIG. 6. Returning to FIG. 9, module 910 is a module for using a first averaging filter to estimate a first portion of a communication channel. The first averaging filter may be, for example, Filter 1, Filter 2, or Filter 3, described above with respect to FIGS. 3 to 5. The first portion may be a first tap or a first tone or frequency as described herein. In module 920, a second averaging filter is used to estimate a second portion of the communication channel. The second averaging filter may be, for example, Filter 1, Filter 2, or Filter 3, described above with respect to FIGS. 3 to 5. The second portion may be a second tap or a second tone or frequency as described herein. Modules 910 and 920 may be combined into a single module in Demod 356 or demodulator 324.

Figure 10:
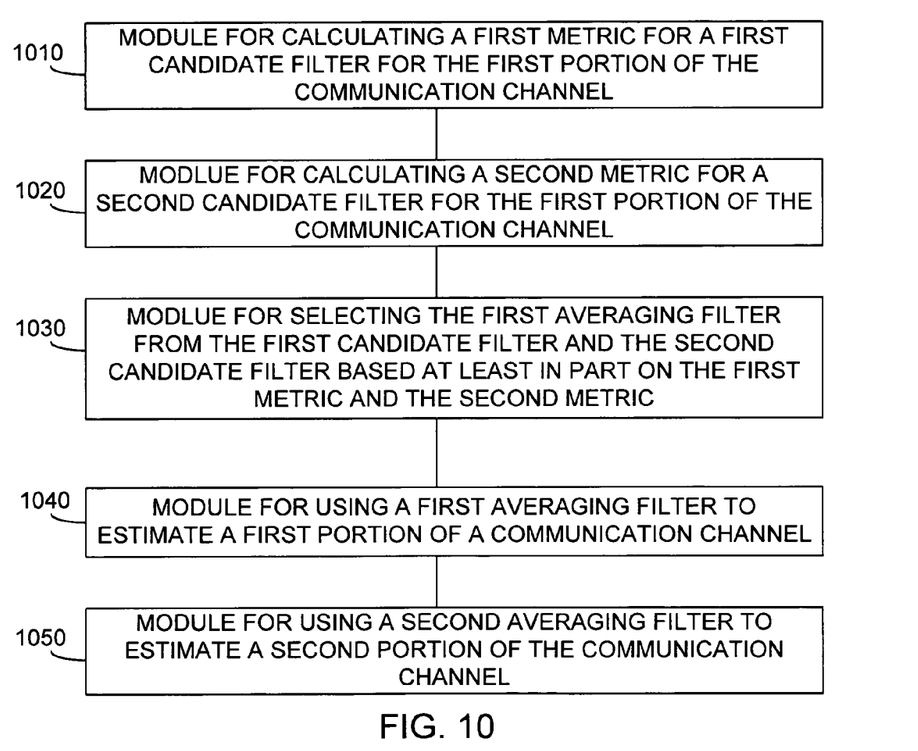
FIG. 10 is a diagram illustrating a demodulator for calculating a channel estimate in a communication system as described herein.

FIG. 10 is a diagram illustrating a demodulator for calculating a channel estimate in a communication system as described herein. FIG. 10 is similar to FIG. 9, except that three modules 1010, 1020 and 1030 are added to the modules of FIG. 9. For example, FIG. 9 may be included in Demod 356 or demodulator 324, shown with respect to FIG. 6. Returning to FIG. 10, in module 1010, a first metric for a first candidate filter for the first portion of the communication channel is calculated. In module 1020, a second metric for a second candidate filter for the first portion of the communication channel is calculated. For the first portion, the first metric may be $M_1(1)$, and the second metric may be $M_1(2)$, as described herein. For the second portion, the first metric may be $M_2(1)$, and the second metric may be $M_2(2)$, as described herein. In module 1030, the first averaging filter is selected from the first candidate filter and the second candidate filter based at least in part on the first metric and the second metric.

For example, the first and the second metric of the first portion may be compared and the candidate filter producing the lowest metric is selected in module 830. Many more candidate filters and many more portions are likely in a practical system. Two candidate filters, two portions and two metrics per portion are used here for illustration. The techniques and systems described will be repeated as many times as required or convenient for the communication system used, such as an OFDM system. In some cases, calculating the first metric for the channel estimate of the first portion of the channel may include calculating the first metric based on a zero weight filter having only zeros for a plurality of filter weights of the zero weight filter.

In some embodiments, the method includes calculating the first averaging filter based on a least squares algorithm (LSA) and calculating the second averaging filter based on the least squares algorithm (LSA).

The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors or demodulators. The memory unit may be implemented within the processor or external to the processor, in which case it can be communicatively coupled to the processor via various means.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

What is claimed is:

1. A method for calculating a channel estimate in a communication system, the method comprising:

using a first averaging filter that performs a first averaging filter operation to estimate a first portion of a communication channel; and using a second averaging filter that performs a second averaging filter operation to estimate a second portion of the communication channel, wherein the second averaging filter operation is different from the first averaging filter operation;

wherein the first and second portions of the communication channel respectively correspond to one of first and second taps of an impulse response of the communication channel and first and second tones of a frequency response of the communication channel.

2. The method of claim 1, further comprising:

calculating a first metric for a first candidate filter for the first portion of the communication channel;

calculating a second metric for a second candidate filter for the first portion of the communication channel; and selecting the first averaging filter from the first candidate filter and the second candidate filter based at least in part on the first metric and the second metric.

3. The method of claim 2, further comprising:
calculating a third metric for the first candidate filter for the second portion of the communication channel;
calculating a fourth metric for the second candidate filter for the second portion of the communication channel; and
selecting the second averaging filter from the first candidate filter and the second candidate filter based at least in part on the third metric and the fourth metric.

4. The method of claim 2, wherein calculating the first metric comprises:
calculating a first function of a first difference between a channel estimate of the first portion of the communication channel obtained without time averaging and a channel estimate of the first portion from the first candidate filter;
calculating a first correction factor as a second function of a first noise variance estimate and at least one of a plurality of weights of the first candidate filter;
adding the first correction factor to the first function to obtain a third function; and
filtering the third function to obtain the first metric.

5. The method of claim 4, wherein the first function comprises a magnitude squared function.

6. The method of claim 4, wherein the filtering the third function comprises using an auto-regressive filter to obtain the first metric.

7. The method of claim 2, wherein calculating the first metric for the first candidate filter for the first portion of the communication channel comprises:
calculating the first metric based on a zero weight filter having only zeros for a plurality of filter weights of the zero weight filter.

8. The method of claim 1, wherein the communication system is an orthogonal frequency division multiplexing communication system.

9. The method of claim 1, wherein the communication system is a code division multiple access system.

10. The method of claim 1, further comprising:
calculating the first averaging filter based at least in part on a first past history of the channel estimates of the first portion of the communication channel without time averaging and based at least in part on a first noise variance; and
calculating the second averaging filter based at least in part on a second past history of the channel estimates of the second portion of the communication channel without time averaging and based at least in part on a second noise variance.

11. The method of claim 10, wherein the calculating the first averaging filter comprises:
calculating a first outer-product of a first vector formed from the first past history of the channel estimates of the first portion of the communication channel, obtained without time-averaging, corresponding to a plurality of OFDM symbols;
filtering the first outer-product to obtain an empirical correlation matrix; multiplying the first vector by a complex conjugate of the channel estimate of the first portion of the communication channel obtained without time-averaging, to obtain a second vector;
subtracting a noise variance estimate from one of the elements of the second vector, to obtain a third vector;
filtering the third vector to obtain an empirical cross-correlation vector; and
multiplying an inverse of the empirical correlation matrix by the empirical cross-correlation vector to obtain the first averaging filter.

12. The method of claim 11, wherein:
the filtering the first outer-product to obtain an empirical correlation matrix comprises using an auto-regressive filter to filter the first outer-product to obtain an empirical correlation matrix; and wherein, the filtering the third vector comprises using a second auto-regressive filter to filter the third vector to obtain an empirical cross-correlation vector.

13. A device for calculating a channel estimate in a communication system, the device comprising:
means for using a first averaging filter that performs a first averaging filter operation to estimate a first portion of a communication channel; and
means for using a second averaging filter that performs a second averaging filter operation to estimate a second portion of the communication channel, wherein the second averaging filter operation is different from the first averaging filter operation;
wherein the first and second portions of the communication channel respectively correspond to one of first and second taps of an impulse response of the communication channel and first and second tones of a frequency response of the communication channel.

14. The device of claim 13, further comprising:
means for calculating a first metric for a first candidate filter for the first portion of the communication channel;
means for calculating a second metric for a second candidate filter for the first portion of the communication channel; and
means for selecting the first averaging filter from the first candidate filter and the second candidate filter based at least in part on the first metric and the second metric.

15. The device of claim 14, further comprising:
means for calculating a third metric for the first candidate filter for the second portion of the communication channel;
means for calculating a fourth metric for the second candidate filter for the second portion of the communication channel; and
means for selecting the second averaging filter from the first candidate filter and the second candidate filter based at least in part on the third metric and the fourth metric.

16. The device of claim 14, wherein the means for calculating the first metric comprises:
means for calculating a first function of a first difference between a channel estimate of the first portion of the communication channel obtained without time averaging and a channel estimate of the first portion from the first candidate filter;
means for calculating a first correction factor as a second function of a first noise variance estimate and at least one of a plurality of weights of the first candidate filter;
means for adding the first correction factor to the first function to obtain a third function; and
means for filtering the third function to obtain the first metric.

17. The device of claim 16, wherein the first function comprises a magnitude squared function.

18. The device of claim 16, wherein the means for filtering the third function comprises means for using an auto-regressive filter to obtain the first metric.

19. The device of claim 14, wherein means for calculating the first metric for the first candidate filter for the first portion of the communication channel comprises:

means for calculating the first metric based on a zero weight filter having only zeros for a plurality of filter weights of the zero weight filter.

20. The device of claim 13, wherein the communication system is an orthogonal frequency division multiplexing communication system.

21. The device of claim 13, wherein the communication system is a code division multiple access system.

22. The device of claim 13, further comprising:
means for calculating the first averaging filter based at least in part on a first past history of the channel estimates of the first portion of the communication channel without time averaging and based at least in part on a first noise variance; and
means for calculating the second averaging filter based at least in part on a second past history of the channel estimates of the second portion of the communication channel without time averaging and based at least in part on a second noise variance.

23. The device of claim 22, wherein the means for calculating the first averaging filter comprises:
means for calculating a first outer-product of a first vector formed from the first past history of the channel estimates of the first portion of the communication channel, obtained without time-averaging, corresponding to a plurality of OFDM symbols;
means for filtering the first outer-product to obtain an empirical correlation matrix;
means for multiplying the first vector by a complex conjugate of the channel estimate of the first portion of the communication channel obtained without time-averaging, to obtain a second vector;
means for subtracting a noise variance estimate from one of the elements of the second vector, to obtain a third vector;
means for filtering the third vector to obtain an empirical cross-correlation vector; and
means for multiplying an inverse of the empirical correlation matrix by the empirical cross-correlation vector to obtain the first averaging filter.

24. The device of claim 23, wherein:
the means for filtering the first outer-product to obtain an empirical correlation matrix comprises means for using an auto-regressive filter to filter the first outer-product to obtain an empirical correlation matrix; and wherein,
the means for filtering the third vector comprises means for using a second auto-regressive filter to filter the third vector to obtain an empirical cross-correlation vector.

25. A communication device comprising:
a receiver configured to a receive wireless communication signal; and
a demodulator coupled to the receiver and configured to:
use a first averaging filter that performs a first averaging filter operation to estimate a first portion of a communication channel; and
use a second averaging filter that performs a second averaging filter operation to estimate a second portion of the communication channel, wherein the second averaging filter operation is different from the first averaging filter operation;
wherein the first and second portions of the communication channel respectively correspond to one of first and second taps of an impulse response of the communication channel and first and second tones of a frequency response of the communication channel.

26. The communication device of claim 25, wherein the demodulator is further configured to:
calculate a first metric for a first candidate filter for the first portion of the communication channel;
calculate a second metric for a second candidate filter for the first portion of the communication channel; and
select the first averaging filter from the first candidate filter and the second candidate filter based at least in part on the first metric and the second metric.

27. The communication device of claim 26, wherein the demodulator is further configured to:
calculate a third metric for the first candidate filter for the second portion of the communication channel;
calculate a fourth metric for the second candidate filter for the second portion of the communication channel; and
select the second averaging filter from the first candidate filter and the second candidate filter based at least in part on the third metric and the fourth metric.

28. The communication device of claim 26, wherein calculating the first metric comprises:
calculating a first function of a first difference between a channel estimate of the first portion of the communication channel obtained without time averaging and a channel estimate of the first portion from the first candidate filter;
calculating a first correction factor as a second function of a first noise variance estimate and at least one of a plurality of weights of the first candidate filter;
adding the first correction factor to the first function to obtain a third function; and
filtering the third function to obtain the first metric.

29. The communication device of claim 28, wherein the first function comprises a magnitude squared function.

30. The communication device of claim 28, wherein the filtering the third function comprises using an auto-regressive filter to obtain the first metric.

31. The communication device of claim 26, wherein calculating the first metric for the first candidate filter for the first portion of the communication channel comprises: calculating the first metric based on a zero weight filter having only zeros for a plurality of filter weights of the zero weight filter.

32. The communication device of claim 25, wherein the demodulator is further configured to:
calculate the first averaging filter based at least in part on a first past history of the channel estimates of the first portion of the communication channel without time averaging and based at least in part on a first noise variance; and
calculate the second averaging filter based at least in part on a second past history of the channel estimates of the second portion of the communication channel without time averaging and based at least in part on a second noise variance.

33. The communication device of claim 32, wherein the calculating the first averaging filter comprises:
calculating a first outer-product of a first vector formed from the first past history of the channel estimates of the first portion of the communication channel, obtained without time-averaging, corresponding to a plurality of OFDM symbols;
filtering the first outer-product to obtain an empirical correlation matrix;
multiplying the first vector by a complex conjugate of the channel estimate of the first portion of the communication channel obtained without time-averaging, to obtain a second vector;
subtracting a noise variance estimate from one of the elements of the second vector, to obtain a third vector;

filtering the third vector to obtain an empirical cross-correlation vector; and multiplying an inverse of the empirical correlation matrix by the empirical cross-correlation vector to obtain the first averaging filter.

34. A machine readable medium having instructions for calculating a channel estimate in a communication system stored thereon, the instructions comprising:
   a first instruction for using a first averaging filter that performs a first averaging filter operation to estimate a first portion of a communication channel; and
   a second instruction for using a second averaging filter that performs a second averaging filter operation to estimate a second portion of the communication channel, wherein the second averaging filter operation is different from the first averaging filter operation;
   wherein the first and second portions of the communication channel respectively correspond to one of first and second taps of an impulse response of the communication channel and first and second tones of a frequency response of the communication channel.

35. The machine readable medium of claim 34, the instructions further comprising:
   a third instruction for calculating a first metric for a first candidate filter for the first portion of the communication channel;
   a fourth instruction for calculating a second metric for a second candidate filter for the first portion of the communication channel; and
   a fifth instruction for selecting the first averaging filter from the first candidate filter and the second candidate filter based at least in part on the first metric and the second metric.

36. The machine readable medium of claim 35, further comprising:
   a sixth instruction for calculating a third metric for the first candidate filter for the second portion of the communication channel;
   a seventh instruction for calculating a fourth metric for the second candidate filter for the second portion of the communication channel; and
   an eighth instruction for selecting the second averaging filter from the first candidate filter and the second candidate filter based at least in part on the third metric and the fourth metric.

37. The machine readable medium of claim 35, wherein the third instruction for calculating the first metric comprises:
   a ninth instruction for calculating a first function of a first difference between a channel estimate of the first portion of the communication channel obtained without time averaging and a channel estimate of the first portion from the first candidate filter;
   a tenth instruction for calculating a first correction factor as a second function of a first noise variance estimate and at least one of a plurality of weights of the first candidate filter;
   an eleventh instruction for adding the first correction factor to the first function to obtain a third function; and
   a twelfth instruction for filtering the third function to obtain the first metric.

38. The machine readable medium of claim 35, wherein the first function comprises a magnitude squared function.

39. The machine readable medium of claim 35, wherein the filtering the third function comprises using an auto-regressive filter to obtain the first metric.

40. The machine readable medium of claim 35, wherein the third instruction for calculating the first metric for the first candidate filter for the first portion of the communication channel comprises: a thirteenth instruction for calculating the first metric based on a zero weight filter having only zeros for a plurality of filter weights of the zero weight filter.

41. The machine readable medium of claim 34, the instructions further comprising:
   a fourteenth instruction for calculating the first averaging filter based at least in part on a first past history of the channel estimates of the first portion of the communication channel without time averaging and based at least in part on a first noise variance; and
   a fifteenth instruction for calculating the second averaging filter based at least in part on a second past history of the channel estimates of the second portion of the communication channel without time averaging and based at least in part on a second noise variance.

42. The machine readable medium of claim 41, wherein the third instruction for calculating the first averaging filter comprises:
   a sixteenth instruction for calculating a first outer-product of a first vector formed from the first past history of the channel estimates of the first portion of the communication channel, obtained without time-averaging, corresponding to a plurality of OFDM symbols;
   a seventeenth instruction for filtering the first outer-product to obtain an empirical correlation matrix;
   an eighteenth instruction for multiplying the first vector by a complex conjugate of the channel estimate of the first portion of the communication channel obtained without time-averaging, to obtain a second vector;
   a nineteenth instruction for subtracting a noise variance estimate from one of the elements of the second vector, to obtain a third vector;
   a twentieth instruction for filtering the third vector to obtain an empirical cross-correlation vector; and
   a twenty-first instruction for multiplying an inverse of the empirical correlation matrix by the empirical cross-correlation vector to obtain the first averaging filter.

43. The machine readable medium of claim 42, wherein:
   the filtering the first outer-product to obtain an empirical correlation matrix comprises using an auto-regressive filter to filter the first outer-product to obtain an empirical correlation matrix; and wherein,
   the filtering the third vector comprises using a second auto-regressive filter to filter the third vector to obtain an empirical cross-correlation vector.

* * * * *